(12) United States Patent
Kato et al.

(10) Patent No.: US 8,474,725 B2
(45) Date of Patent: Jul. 2, 2013

(54) WIRELESS IC DEVICE

(75) Inventors: Noboru Kato, Moriyama (JP); Yuya Dokai, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 650 days.

(21) Appl. No.: 12/510,340

(22) Filed: Jul. 28, 2009

(65) Prior Publication Data

US 2009/0277966 A1 Nov. 12, 2009

Related U.S. Application Data

(63) Continuation of application No. PCT/JP2008/055567, filed on Mar. 25, 2008.

(30) Foreign Application Priority Data

Apr. 27, 2007 (JP) ................................. 2007-118543

(51) Int. Cl.
*G06K 19/06* (2006.01)

(52) U.S. Cl.
USPC ..... 235/492; 235/487; 340/572.7; 340/572.8; 257/279

(58) Field of Classification Search
USPC ................ 235/487, 492; 257/679; 340/572.7, 340/572.8; 307/104
See application file for complete search history.

(56) References Cited

U.S. PATENT DOCUMENTS

| | | |
|---|---|---|
| 3,364,564 A | 1/1968 | Kurtz et al. |
| 4,794,397 A | 12/1988 | Ohe et al. |
| 5,232,765 A | 8/1993 | Yano et al. |
| 5,253,969 A | 10/1993 | Richert |
| 5,337,063 A | 8/1994 | Takahira |
| 5,374,937 A | 12/1994 | Tsunekawa et al. |
| 5,399,060 A | 3/1995 | Richert |
| 5,491,483 A | 2/1996 | D'Hont |
| 5,757,074 A | 5/1998 | Matloubian et al. |
| 5,854,480 A | 12/1998 | Noto |
| 5,903,239 A | 5/1999 | Takahashi et al. |
| 5,936,150 A | 8/1999 | Kobrin et al. |

(Continued)

FOREIGN PATENT DOCUMENTS

| | | |
|---|---|---|
| EP | 0 694 874 A2 | 1/1996 |
| EP | 0 977 145 A2 | 2/2000 |

(Continued)

OTHER PUBLICATIONS

Official Communication issued in corresponding European Patent Application No. 08722777.3, mailed on Jul. 9, 2010.

(Continued)

*Primary Examiner* — Michael G Lee
*Assistant Examiner* — Tabitha Chedekel
(74) *Attorney, Agent, or Firm* — Keating & Bennett, LLP

(57) ABSTRACT

A wireless IC device includes a wireless IC chip arranged to process a transmission/received signal, a matching inductance element and a planar electrode which are provided on the surface of a feeder circuit board formed by a flexible dielectric, and a loop-shaped radiation plate provided on the undersurface of the feeder circuit board. Both ends of the radiation plate are coupled to a resonance circuit including an inductance element by electromagnetic field coupling. The wireless IC chip is operated using a signal received by the radiation plate. A response signal transmitted from the wireless IC chip is externally transmitted from the radiation plate.

14 Claims, 5 Drawing Sheets

U.S. PATENT DOCUMENTS

| | | | |
|---|---|---|---|
| 5,955,723 A | 9/1999 | Reiner | |
| 5,977,914 A * | 11/1999 | Harano | 343/700 MS |
| 5,995,006 A | 11/1999 | Walsh | |
| 6,104,311 A | 8/2000 | Lastinger | |
| 6,107,920 A | 8/2000 | Eberhardt et al. | |
| 6,172,608 B1 | 1/2001 | Cole | |
| 6,181,287 B1 | 1/2001 | Beigel | |
| 6,190,942 B1 | 2/2001 | Wilm et al. | |
| 6,259,369 B1 | 7/2001 | Monico | |
| 6,271,803 B1 | 8/2001 | Watanabe et al. | |
| 6,335,686 B1 | 1/2002 | Goff et al. | |
| 6,362,784 B1 | 3/2002 | Kane et al. | |
| 6,367,143 B1 | 4/2002 | Sugimura | |
| 6,378,774 B1 | 4/2002 | Emori et al. | |
| 6,406,990 B1 | 6/2002 | Kawai | |
| 6,448,874 B1 | 9/2002 | Shiino et al. | |
| 6,462,716 B1 | 10/2002 | Kushihi | |
| 6,542,050 B1 | 4/2003 | Arai et al. | |
| 6,600,459 B2 | 7/2003 | Yokoshima et al. | |
| 6,634,564 B2 | 10/2003 | Kuramochi | |
| 6,664,645 B2 | 12/2003 | Kawai | |
| 6,763,254 B2 | 7/2004 | Nishikawa | |
| 6,828,881 B2 | 12/2004 | Mizutani et al. | |
| 6,927,738 B2 | 8/2005 | Senba et al. | |
| 6,963,729 B2 | 11/2005 | Uozumi | |
| 7,088,307 B2 | 8/2006 | Imaizumi | |
| 7,112,952 B2 | 9/2006 | Arai et al. | |
| 7,119,693 B1 | 10/2006 | Devilbiss | |
| 7,129,834 B2 | 10/2006 | Naruse et al. | |
| 7,248,221 B2 | 7/2007 | Kai et al. | |
| 7,250,910 B2 | 7/2007 | Yoshikawa et al. | |
| 7,276,929 B2 | 10/2007 | Arai et al. | |
| 7,317,396 B2 | 1/2008 | Ujino | |
| 7,405,664 B2 | 7/2008 | Sakama et al. | |
| 7,967,204 B2 * | 6/2011 | Hadley et al. | 235/451 |
| 2002/0011967 A1 | 1/2002 | Goff et al. | |
| 2002/0044092 A1 | 4/2002 | Kushihi | |
| 2002/0067316 A1 | 6/2002 | Yokoshima et al. | |
| 2003/0006901 A1 | 1/2003 | Kim et al. | |
| 2003/0020661 A1 | 1/2003 | Sato | |
| 2003/0169153 A1 | 9/2003 | Muller | |
| 2004/0001027 A1 | 1/2004 | Killen et al. | |
| 2004/0023701 A1 * | 2/2004 | Hankui | 455/575.7 |
| 2004/0066617 A1 | 4/2004 | Hirabayashi et al. | |
| 2004/0217915 A1 | 11/2004 | Imaizumi | |
| 2004/0219956 A1 | 11/2004 | Iwai et al. | |
| 2004/0227673 A1 | 11/2004 | Iwai et al. | |
| 2005/0092836 A1 | 5/2005 | Kudo | |
| 2005/0099337 A1 | 5/2005 | Takei et al. | |
| 2005/0125093 A1 | 6/2005 | Kikuchi et al. | |
| 2005/0134460 A1 | 6/2005 | Usami | |
| 2005/0138798 A1 | 6/2005 | Sakama et al. | |
| 2005/0140512 A1 | 6/2005 | Sakama et al. | |
| 2005/0232412 A1 | 10/2005 | Ichihara et al. | |
| 2005/0236623 A1 | 10/2005 | Takechi et al. | |
| 2005/0275539 A1 | 12/2005 | Sakama et al. | |
| 2006/0001138 A1 | 1/2006 | Sakama et al. | |
| 2006/0043198 A1 | 3/2006 | Forster | |
| 2006/0055060 A1 | 3/2006 | Kameda et al. | |
| 2006/0071084 A1 | 4/2006 | Detig et al. | |
| 2006/0105820 A1 * | 5/2006 | Takahashi | 455/575.1 |
| 2006/0109185 A1 | 5/2006 | Iwai et al. | |
| 2006/0145872 A1 | 7/2006 | Tanaka et al. | |
| 2006/0158380 A1 | 7/2006 | Son et al. | |
| 2006/0170606 A1 | 8/2006 | Yamagajo et al. | |
| 2006/0220871 A1 | 10/2006 | Baba et al. | |
| 2006/0267138 A1 | 11/2006 | Kobayashi | |
| 2007/0004028 A1 | 1/2007 | Lair et al. | |
| 2007/0018893 A1 | 1/2007 | Kai et al. | |
| 2007/0040028 A1 | 2/2007 | Kawamata | |
| 2007/0052613 A1 | 3/2007 | Gallschuetz et al. | |
| 2007/0069037 A1 | 3/2007 | Kawai | |
| 2007/0132591 A1 | 6/2007 | Khatri | |
| 2007/0164414 A1 | 7/2007 | Dokai et al. | |
| 2007/0252700 A1 | 11/2007 | Ishihara et al. | |
| 2007/0252703 A1 | 11/2007 | Kato et al. | |
| 2007/0285335 A1 | 12/2007 | Bungo et al. | |
| 2008/0024156 A1 | 1/2008 | Arai et al. | |
| 2008/0087990 A1 | 4/2008 | Kato et al. | |
| 2008/0169905 A1 | 7/2008 | Slatter | |
| 2008/0272885 A1 | 11/2008 | Atherton | |
| 2009/0002130 A1 | 1/2009 | Kato | |
| 2009/0009007 A1 | 1/2009 | Kato et al. | |
| 2009/0065594 A1 | 3/2009 | Kato et al. | |

FOREIGN PATENT DOCUMENTS

| | | |
|---|---|---|
| EP | 1 010 543 A1 | 6/2000 |
| EP | 1 160 915 A2 | 12/2001 |
| EP | 1 170 795 A2 | 1/2002 |
| EP | 2 012 258 A1 | 1/2009 |
| JP | 50-143451 A | 11/1975 |
| JP | 62-127140 U | 8/1987 |
| JP | 03-262313 A | 11/1991 |
| JP | 04-150011 A | 5/1992 |
| JP | 04-167500 A | 6/1992 |
| JP | 05-327331 A | 12/1993 |
| JP | 6-53733 A | 2/1994 |
| JP | 06-077729 A | 3/1994 |
| JP | 06-177635 A | 6/1994 |
| JP | 07-183836 A | 7/1995 |
| JP | 08-056113 A | 2/1996 |
| JP | 8-87580 A | 4/1996 |
| JP | 11-149537 A | 6/1996 |
| JP | 08-176421 A | 7/1996 |
| JP | 08-180160 A | 7/1996 |
| JP | 08-279027 A | 10/1996 |
| JP | 08-307126 A | 11/1996 |
| JP | 08-330372 A | 12/1996 |
| JP | 09-014150 A | 1/1997 |
| JP | 09-035025 A | 2/1997 |
| JP | 09-245381 A | 9/1997 |
| JP | 09-252217 A | 9/1997 |
| JP | 09-270623 A | 10/1997 |
| JP | 9-512367 A | 12/1997 |
| JP | 10-069533 A | 3/1998 |
| JP | 10-505466 A | 5/1998 |
| JP | 10-171954 A | 6/1998 |
| JP | 10-193849 A | 7/1998 |
| JP | 10-293828 A | 11/1998 |
| JP | 11-039441 A | 2/1999 |
| JP | 11-085937 A | 3/1999 |
| JP | 11-102424 A | 4/1999 |
| JP | 11-103209 A | 4/1999 |
| JP | 11-149536 A | 6/1999 |
| JP | 11-149538 A | 6/1999 |
| JP | 11-219420 A | 8/1999 |
| JP | 11-220319 A | 8/1999 |
| JP | 11-328352 A | 11/1999 |
| JP | 11-346114 A | 12/1999 |
| JP | 11-515094 A | 12/1999 |
| JP | 2000-21128 A | 1/2000 |
| JP | 2000-021639 A | 1/2000 |
| JP | 2000-022421 A | 1/2000 |
| JP | 2005-229474 A | 1/2000 |
| JP | 2000-059260 A | 2/2000 |
| JP | 2000-085283 A | 3/2000 |
| JP | 2000-090207 A | 3/2000 |
| JP | 2000-132643 A | 5/2000 |
| JP | 2000-137778 A | 5/2000 |
| JP | 2000-137785 A | 5/2000 |
| JP | 2000-148948 A | 5/2000 |
| JP | 2000-172812 A | 6/2000 |
| JP | 2000-222540 A | 8/2000 |
| JP | 2000-510271 A | 8/2000 |
| JP | 2000-243797 A | 9/2000 |
| JP | 2000-251049 A | 9/2000 |
| JP | 2000-276569 A | 10/2000 |
| JP | 2000-286634 A | 10/2000 |
| JP | 2000-286760 A | 10/2000 |
| JP | 2000-311226 A | 11/2000 |
| JP | 2000-321984 A | 11/2000 |
| JP | 3075400 U | 11/2000 |
| JP | 2000-349680 A | 12/2000 |
| JP | 2001-028036 A | 1/2001 |
| JP | 2007-18067 A | 1/2001 |
| JP | 2001-043340 A | 2/2001 |
| JP | 2001-66990 A | 3/2001 |

| | | | | | | |
|---|---|---|---|---|---|---|
| JP | 2001-505682 A | 4/2001 | | JP | 2004-280390 A | 10/2004 |
| JP | 2001-168628 A | 6/2001 | | JP | 2004-287767 A | 10/2004 |
| JP | 2001-188890 A | 7/2001 | | JP | 2004-297249 A | 10/2004 |
| JP | 2001-240046 A | 9/2001 | | JP | 2004-297681 A | 10/2004 |
| JP | 2001-256457 A | 9/2001 | | JP | 2004-319848 A | 11/2004 |
| JP | 2001-514777 A | 9/2001 | | JP | 2004-326380 A | 11/2004 |
| JP | 2001-319380 A | 11/2001 | | JP | 2004-334268 A | 11/2004 |
| JP | 2001-331976 A | 11/2001 | | JP | 2004-336250 A | 11/2004 |
| JP | 2001-332923 A | 11/2001 | | JP | 2004-343000 A | 12/2004 |
| JP | 2001-344574 A | 12/2001 | | JP | 2004-362190 A | 12/2004 |
| JP | 2001-351084 A | 12/2001 | | JP | 2004-362341 A | 12/2004 |
| JP | 2001-352176 A | 12/2001 | | JP | 2004-362602 A | 12/2004 |
| JP | 2002-024776 A | 1/2002 | | JP | 2005-124061 A | 5/2005 |
| JP | 2002-026513 A | 1/2002 | | JP | 2005-129019 A | 5/2005 |
| JP | 2002-042076 A | 2/2002 | | JP | 2005-136528 A | 5/2005 |
| JP | 2002-063557 A | 2/2002 | | JP | 3653099 B2 | 5/2005 |
| JP | 2002-505645 A | 2/2002 | | JP | 2005-165839 A | 6/2005 |
| JP | 2002-076750 A | 3/2002 | | JP | 2005-167327 A | 6/2005 |
| JP | 2002-76750 A | 3/2002 | | JP | 2005-167813 A | 6/2005 |
| JP | 2002-150245 A | 5/2002 | | JP | 2005-190417 A | 7/2005 |
| JP | 2002-158529 A | 5/2002 | | JP | 2005-191705 A | 7/2005 |
| JP | 2002-175508 A | 6/2002 | | JP | 2005-210676 A | 8/2005 |
| JP | 2002-183690 A | 6/2002 | | JP | 2005-210680 A | 8/2005 |
| JP | 2002-185358 A | 6/2002 | | JP | 2005-217822 A | 8/2005 |
| JP | 2002-204117 A | 7/2002 | | JP | 2005-236339 A | 9/2005 |
| JP | 2002-522849 A | 7/2002 | | JP | 2005-244778 A | 9/2005 |
| JP | 2002-230128 A | 8/2002 | | JP | 2005-275870 A | 10/2005 |
| JP | 2002-252117 A | 9/2002 | | JP | 2005-284352 A | 10/2005 |
| JP | 2002-259934 A | 9/2002 | | JP | 2005-295135 A | 10/2005 |
| JP | 2002-298109 A | 10/2002 | | JP | 2005-311205 A | 11/2005 |
| JP | 2002-308437 A | 10/2002 | | JP | 2005-321305 A | 11/2005 |
| JP | 2002-319008 A | 10/2002 | | JP | 2005-335755 A | 12/2005 |
| JP | 2002-362613 A | 12/2002 | | JP | 2005-346820 A | 12/2005 |
| JP | 2002-373029 A | 12/2002 | | JP | 2005-352858 A | 12/2005 |
| JP | 2002-373323 A | 12/2002 | | JP | 2006-025390 A | 1/2006 |
| JP | 2002-374139 A | 12/2002 | | JP | 2006-031766 A | 2/2006 |
| JP | 2003-006599 A | 1/2003 | | JP | 2006-39902 A | 2/2006 |
| JP | 2003-016412 A | 1/2003 | | JP | 2006-67479 A | 3/2006 |
| JP | 2003-030612 A | 1/2003 | | JP | 2006-72706 A | 3/2006 |
| JP | 2003-44789 A | 2/2003 | | JP | 2006-80367 A | 3/2006 |
| JP | 2003-046318 A | 2/2003 | | JP | 2006-92630 A | 4/2006 |
| JP | 2003-58840 A | 2/2003 | | JP | 2006-102953 A | 4/2006 |
| JP | 2003-067711 A | 3/2003 | | JP | 2006-107296 A | 4/2006 |
| JP | 2003-069335 A | 3/2003 | | JP | 2006-148518 A | 6/2006 |
| JP | 2003-076947 A | 3/2003 | | JP | 2006-174151 A | 6/2006 |
| JP | 2003-085501 A | 3/2003 | | JP | 2006-195795 A | 7/2006 |
| JP | 2003-085520 A | 3/2003 | | JP | 2006-203187 A | 8/2006 |
| JP | 2003-87008 A | 3/2003 | | JP | 2006-203852 A | 8/2006 |
| JP | 2003-87044 A | 3/2003 | | JP | 2006-217000 A | 8/2006 |
| JP | 2003-099720 A | 4/2003 | | JP | 2006-232292 A | 9/2006 |
| JP | 2003-099721 A | 4/2003 | | JP | 2006-270212 A | 10/2006 |
| JP | 2003-110344 A | 4/2003 | | JP | 2006-285911 A | 10/2006 |
| JP | 2003-132330 A | 5/2003 | | JP | 2006-302219 A | 11/2006 |
| JP | 2003-134007 A | 5/2003 | | JP | 2006-309401 A | 11/2006 |
| JP | 2003-155062 A | 5/2003 | | JP | 2006-323481 A | 11/2006 |
| JP | 2003-158414 A | 5/2003 | | JP | 2007-043535 A | 2/2007 |
| JP | 2003-187207 A | 7/2003 | | JP | 2007-048126 A | 2/2007 |
| JP | 2003-187211 A | 7/2003 | | JP | 2007-65822 A | 3/2007 |
| JP | 2003-188338 A | 7/2003 | | JP | 2007-096768 A | 4/2007 |
| JP | 2003-198230 A | 7/2003 | | JP | 2007-122542 A | 5/2007 |
| JP | 2003-209421 A | 7/2003 | | JP | 2007-150868 A | 6/2007 |
| JP | 2003-216919 | 7/2003 | | JP | 2007-159129 A | 6/2007 |
| JP | 2003-218624 A | 7/2003 | | JP | 4069958 B2 | 4/2008 |
| JP | 2003-233780 A | 8/2003 | | JP | 11-175678 A | 1/2009 |
| JP | 2003-242471 A | 8/2003 | | NL | 9100176 A | 3/1992 |
| JP | 2003-243918 A | 8/2003 | | NL | 9100347 A | 3/1992 |
| JP | 2003-249813 A | 9/2003 | | WO | 98/40930 A1 | 9/1998 |
| JP | 2003-529163 A | 9/2003 | | WO | 99/67754 A1 | 12/1999 |
| JP | 2003-288560 A | 10/2003 | | WO | 00/10122 A2 | 2/2000 |
| JP | 2003-309418 A | 10/2003 | | WO | 02/061675 A1 | 8/2002 |
| JP | 2003-317060 A | 11/2003 | | WO | 02/097723 A1 | 12/2002 |
| JP | 2003-331246 A | 11/2003 | | WO | 03/079305 A1 | 9/2003 |
| JP | 2003-332820 A | 11/2003 | | WO | 2004/036772 A1 | 4/2004 |
| JP | 2004-040597 A | 2/2004 | | WO | 2004/070879 A | 8/2004 |
| JP | 2004-082775 A | 3/2004 | | WO | 2004/072892 A1 | 8/2004 |
| JP | 2004-88218 A | 3/2004 | | WO | 2005/073937 A | 8/2005 |
| JP | 2004-096566 A | 3/2004 | | WO | 2005/115849 A1 | 12/2005 |
| JP | 2004-253858 A | 9/2004 | | WO | 2006/045682 A | 5/2006 |
| JP | 2004-527864 A | 9/2004 | | | | |

| | | |
|---|---|---|
| WO | 2007/083574 A1 | 7/2007 |
| WO | 2007/125683 A1 | 11/2007 |
| WO | 2007/138857 A1 | 12/2007 |

OTHER PUBLICATIONS

English translation of NL9100176, published on Mar. 2, 1992.
English translation of NL9100347, published on Mar. 2, 1992.
Kato et al.: "ANTENNA"; U.S. Appl. No. 11/928,502, filed Oct. 30, 2007.
Kato et al.: "Wireless IC Device", U.S. Appl. No. 12/211,117, filed Sep. 16, 2008.
Kato et al.: "ANTENNA"; U.S. Appl. No. 11/688,290, filed Mar. 20, 2007.
Kato et al.: "Electromagnetic-Coupling-Module-Attached Article"; U.S. Appl. No. 11/740,509, filed Apr. 26, 2007.
Kato et al.: "Product Including Power Supply Circuit Board"; U.S. Appl. No. 12/234,949, filed Sep. 22, 2008.
Kato et al.: "Data Coupler"; U.S. Appl. No. 12/252,475, filed Oct. 16, 2008.
Kato et al.; "Information Terminal Device"; U.S. Appl. No. 12/267,666, filed Nov. 10, 2008.
Kato et al.: "Wireless IC Device and Wireless IC Device Composite Component"; U.S. Appl. No. 12/276,444, filed Nov. 24, 2008.
Dokai et al.: "Optical Disc"; U.S. Appl. No. 12/326,916, filed Dec. 3, 2008.
Dokai et al.: "System for Inspecting Electromagnetic Coupling Modules and Radio IC Devices and Method for Manufacturing Electromagnetic Coupling Modules and Radio IC Devices Using The System"; U.S. Appl. No. 12/274,400, filed Nov. 20, 2008.
Kato: "Wireless IC Device"; U.S. Appl. No. 11/964,185, filed Dec. 26, 2007.
Kato et al.: "Radio Frequency IC Device"; U.S. Appl. No. 12/336,629, filed Dec. 17, 2008.
Kato et al.: "Wireless IC Device and Component for Wireless IC Device"; U.S. Appl. No. 12/339,198, filed Dec. 19, 2008.
Ikemoto et al.: "Wireless IC Device"; U.S. Appl. No. 11/851,651, filed Sep. 7, 2007.
Kataya et al.: "Wireless IC Device and Electronic Device"; U.S. Appl. No. 11/851,661, filed Sep. 7, 2007.
Dokai et al.: "ANTENNA and Radio IC Device"; U.S. Appl. No. 12/350,307, filed Jan. 8, 2009.
Official Communication issued in International Application No. PCT/JP2007/066007, mailed on Nov. 27, 2007.
Dokai et al.: "Wireless IC Device and Component for Wireless IC Device"; U.S. Appl. No. 12/359,690, filed Jan. 26, 2009.
Dokai et al.: "Test System for Radio Frequency IC Devices and Method of Manufacturing Radio Frequency IC Devices Using The Same"; U.S. Appl. No. 12/388,826, filed Feb. 19, 2009.
Official Communication issued in International Application No. PCT/JP2008/061955, mailed on Sep. 30, 2008.
Official Communication issued in International Application No. PCT/JP2007/066721, mailed on Nov. 27, 2007.
Official Communication issued in International Application No. PCT/JP2007/070460, mailed on Dec. 11, 2007.
Kato et al.: "Wireless IC Device"; U.S. Appl. No. 12/390,556, filed Feb. 23, 2009.
Kato et al.: "Inductively Coupled Module and Item With Inductively Coupled Module"; U.S. Appl. No. 12/398,497, filed Mar. 5, 2009.
Official Communication issued in International Patent Application No. PCT/JP2008/050945, mailed on May 1, 2008.
Kato et al.: "Article Having Electromagnetic Coupling Module Attached Thereto"; U.S. Appl. No. 12/401,767, filed Mar. 11, 2009.
Taniguchi et al.: "Antenna Device and Radio Frequency IC Device"; U.S. Appl. No. 12/326,117, filed Dec. 2, 2008.
Official Communication issued in International Patent Application No. PCT/JP2008/061442, mailed on Jul. 22, 2008.
Kato et al.: "Container With Electromagnetic Coupling Module"; U.S. Appl. No. 12/426,369, filed Apr. 20, 2009.
Kato: "Wireless IC Device"; U.S. Appl. No. 12/429,346, filed Apr. 24, 2009.
Official communication issued in counterpart International Application No. PCT/JP2008/071502, mailed Feb. 24, 2009.
Kato et al.: "Wireless IC Device and Manufacturing Method Thereof," U.S. Appl. No. 12/432,854, filed Apr. 30, 2009.
Official communication issued in counterpart International Application No. PCT/JP2008/058168, mailed Aug. 12, 2008.
Official communication issued in counterpart International Application No. PCT/JP2008/062886, mailed Oct. 21, 2008.
Kato et al.: "Wireless IC Device," U.S. Appl. No. 12/469,896, filed May 21, 2009.
Ikemoto et al.: "Wireless IC Device," U.S. Appl. No. 12/496,709, filed Jul. 2, 2009.
Official communication issued in counterpart International Application No. PCT/JP2008/062947, mailed Aug. 19, 2008.
Official communication issued in counterpart International Application No. PCT/JP2008/056026, mailed Jul. 1, 2008.
Ikemoto et al.: "Wireless IC Device and Electrionic Apparatus," U.S. Appl. No. 12/503,188, filed Jul. 15, 2009.
Official communication issued in counterpart International Application No. PCT/JP2008/055567, mailed May 20, 2008.
Official communication issued in counterpart International Application No. PCT/JP2008/051853, mailed Apr. 22, 2008.
Official communication issued in counterpart International Application No. PCT/JP2008/057239, mailed Jul. 22, 2008.
Kimura et al.: "Wireless IC Device," U.S. Appl. No. 12/510,338, filed Jul. 28, 2009.
Kato et al.: "Wireless IC Device," U.S. Appl. No. 12/510,347, filed Jul. 28, 2009.
Kato: "Wireless IC Device," U.S. Appl. No. 12/510,344, filed Jul. 28, 2009.
Official communication issued in Japanese Application No. 2007-531524, mailed on Sep. 11, 2007.
Official communication issued in Japanese Application No. 2007-531525, mailed on Sep. 25, 2007.
Official communication issued in Japanese Application No. 2007-531524, mailed on Dec. 12, 2007.
Official communication issued in European Application No. 07706650.4, mailed on Nov. 24, 2008.
Mukku-Sha, "Musen IC Tagu Katsuyo-no Subete" "(All About Wireless IC Tags"), RFID, pp. 112-126.
Dokai et al.: "Wireless IC Device and Component for Wireless IC Device"; U.S. Appl. No. 11/624,382, filed Jan. 18, 2007.
Dokai et al.: "Wireless IC Device, and Component for Wireless IC Device"; U.S. Appl. No. 11/930,818, filed Oct. 31, 2007.
Kato et al.: "Wireless IC Device"; U.S. Appl. No. 12/042,399, filed Mar. 5, 2008.
Official communication issued in related U.S. Appl. No. 12/042,399, mailed on Aug. 25, 2008.

\* cited by examiner

WIRELESS IC DEVICE

BACKGROUND OF THE INVENTION

1. Field of the Invention

The present invention relates to wireless IC devices, and, more particularly, to a wireless IC device including a wireless IC chip used for an RFID (Radio Frequency IDentification) system.

2. Description of the Related Art

In recent years, as a product management system, an RFID system has been developed in which a reader/writer for generating an induction field communicates with an IC chip (hereinafter also referred to as an IC tag or a wireless IC chip) attached to a product or a case in a non-contact manner so as to obtain predetermined information stored in the IC chip. As a wireless IC device including an IC chip, a module for a non-contact IC medium disclosed in Japanese Unexamined Patent Application Publication No. 2003-331246 is known.

The module for a non-contact IC medium is formed by an LSI, a loop antenna, and a capacitance element. A resonance circuit is formed using the inductance of a line of the loop antenna and the capacitance of the capacitance element, and performs impedance matching between the loop antenna and the LSI.

However, in the module for a non-contact IC medium, in order to obtain an inductance value required for the impedance matching between the loop antenna and the LSI, it is necessary to adjust the length of the loop antenna. Accordingly, the length of the loop antenna is changed in accordance with the input impedance of a used LSI, and the size of the module itself and an antenna radiation characteristic are changed.

SUMMARY OF THE INVENTION

Preferred embodiments of the present invention provide a wireless IC device that is capable of setting the size of a radiation plate and a radiation characteristic irrespective of the impedance of a wireless IC chip.

A wireless IC device according to a preferred embodiment of the present invention includes a wireless IC chip arranged to process a transmission/received signal; a feeder circuit board provided with a resonance circuit including a matching inductance element; and a radiation plate that is located on the feeder circuit board and is electrically isolated from the resonance circuit. An electromagnetic coupling module is obtained by disposing the wireless IC chip on the feeder circuit board and coupling the wireless IC chip to the resonance circuit. Both ends of the radiation plate are coupled to the resonance circuit by electromagnetic field coupling. The wireless IC chip is operated using a signal received by the radiation plate, and a response signal transmitted from the wireless IC chip is externally transmitted from the radiation plate.

In the above-described wireless IC device, since both ends of the radiation plate are coupled to the resonance circuit including the matching inductance element by electromagnetic field coupling, the impedance matching between the wireless IC chip and the radiation plate is performed using the inductance of the matching inductance element and the capacitance between portions of a wiring electrode of the matching inductance element. As a result, it is possible to set the size and shape of the radiation plate irrespective of the impedance of the wireless IC chip so as to obtain a predetermined radiation characteristic.

According to a preferred embodiment of the present invention, the impedance matching between a wireless IC chip and a radiation plate uses the inductance of a matching inductance element and a capacitance between portions of a wiring electrode of the matching inductance element, and it is possible to set the size and shape of the radiation plate irrespective of the impedance of the wireless IC chip so as to obtain a predetermined radiation characteristic.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
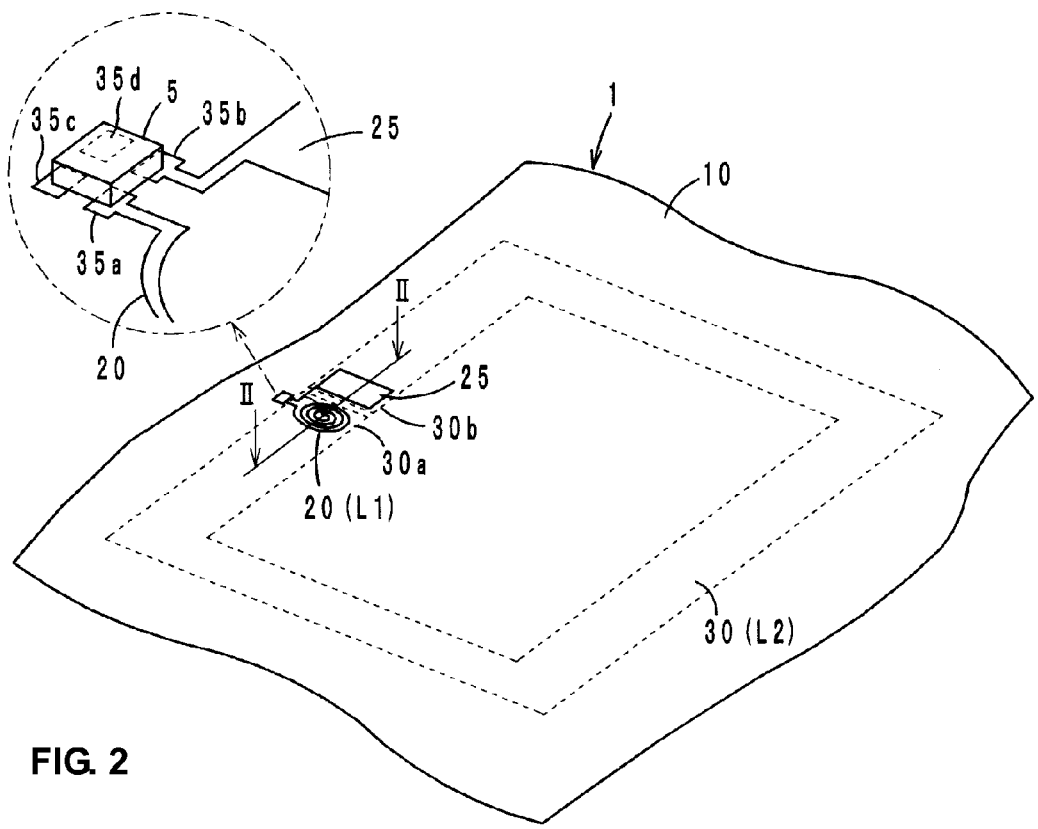
FIG. 1 is a perspective view of a wireless IC device according to a first preferred embodiment of the present invention.

A wireless IC device according to preferred embodiments of the present invention will be described below with reference to the accompanying drawings. In the drawings, the same reference numeral is used to represent the same component or the same element so as to avoid repeated explanation.

Figure 2:
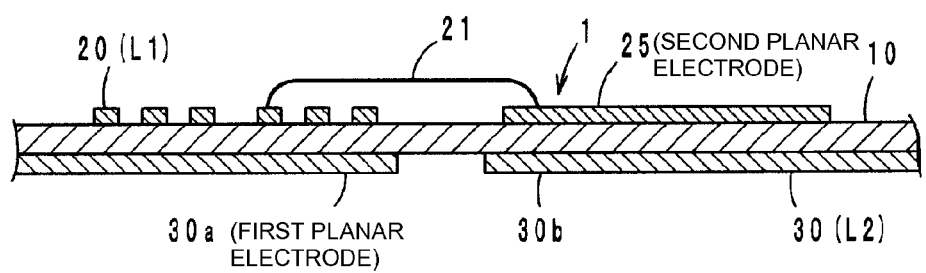
FIG. 2 is an enlarged cross-sectional view taken along the line II-II of FIG. 1.

First Preferred Embodiment FIGS. 1 and 2

FIGS. 1 and 2 illustrate a wireless IC device according to the first preferred embodiment of the present invention. This wireless IC device includes an wireless IC chip 5 arranged to process a transmission/received signal of a predetermined frequency, an inductance element 20 (L1) and a planar electrode 25 (hereinafter also referred to as a second planar electrode) which are disposed on the surface of a feeder circuit board 10 preferably defined by a flexible dielectric (for example, a PET film), and a radiation plate 30 disposed on the undersurface of the feeder circuit board 10.

End portions 30a and 30b of the radiation plate 30 having a loop shape face each other, so that a second inductance element L2 is formed. The radiation plate 30 is obtained preferably by attaching a metal sheet made of a conductive material such as aluminum foil or copper foil to the undersurface of the feeder circuit board 10 or applying a coating of conductive paste or metal plating made of Al, Cu, or Ag to the undersurface of the feeder circuit board 10.

The inductance element 20 is obtained by helically arranging a wiring electrode. The center end portion of the helical wiring electrode is electrically connected to the planar electrode 25 via a line 21, and the outer end portion of the helical wiring electrode is electrically connected to a connection electrode 35a. Furthermore, the inductance element 20 faces the one end portion 30a (hereinafter also referred to as a first planar electrode) of the radiation plate 30.

The planar electrode 25 is obtained by attaching a metal sheet to the surface of the feeder circuit board 10 or applying a coating of conductive paste or metal plating to the surface of the feeder circuit board 10, and is disposed so that it faces the other end portion 30b of the radiation plate 30. The planar electrode 25 is electrically connected to a connection electrode 35b.

The connection electrodes 35a and 35b are electrically connected to an input/output terminal (not illustrated) of the wireless IC chip 5 via a metal bump or the like, and connection electrodes 35c and 35d that are electrically open are electrically connected to a ground terminal (not illustrated) of the wireless IC chip 5 via a metal bump or the like. The wireless IC chip 5 may preferably include a clock circuit, a logic circuit, a memory circuit, etc., and stores necessary information. The memory circuit may be a rewritable memory circuit.

The feeder circuit board 10 on which the wireless IC chip 5 is disposed is referred to as an electromagnetic coupling module 1.

In the electromagnetic coupling module 1, the inductance element 20 and a first end portion 30a of the radiation plate 30 which face each other are coupled to each other by magnetic field coupling, and the planar electrode 25 and a second end portion 30b of the radiation plate 30 which face each other are coupled to each other by electric field coupling (capacitive coupling).

Coupling at the one end portion 30a and the other end portion 30b of the radiation plate 30 may be magnetic field coupling or electric field coupling. In the present invention, electromagnetic field coupling means coupling via an electric field and/or a magnetic field.

In a wireless IC device having the above-described configuration, by disposing the strip radiation plate 30 so that the one end portion 30a thereof and the other end portion 30b thereof are close to each other, the radiation plate 30 and a resonance circuit including the inductance element 20 can be coupled to each other by electromagnetic field coupling. Accordingly, the impedance matching between the wireless IC chip 5 and the radiation plate 30 is performed using the inductance L1 of the inductance element 20, a capacitance Cf between portions of the wiring electrode of the inductance element 20, and a capacitance C1 between the planar electrode 25 and the radiation plate 30. As a result, the variations in capacitance and the variations in frequency characteristics are small. In order to obtain a predetermined radiation characteristic, it is possible to set the size and shape of the radiation plate 30 irrespective of the impedance of the wireless IC chip 5.

That is, the wireless IC device receives high-frequency signals (for example, UHF signals) emitted from a reader/writer (not illustrated) using the radiation plate 30, causes an LC resonance circuit (in an equivalent circuit, an LC resonance circuit formed by the inductance L1 of the inductance element 20, the inductance L2 of the radiation plate 30, and the capacitance C1 between the other end portion 30b of the radiation plate 30 and the planar electrode 25) to resonate, and supplies only a received signal that falls within a predetermined frequency range to the wireless IC chip 5. On the other hand, the wireless IC device extracts predetermined energy from the received signal, uses the extracted energy to match the frequency of information stored in the wireless IC chip 5 to a predetermined frequency in the LC resonance circuit, and transmits the information from the radiation plate 30 to the reader/writer.

Since the first end portion 30a of the radiation plate 30 faces the inductance element 20, a magnetic field generated at the inductance element 20 is emitted to the first end portion 30a of the radiation plate 30, an eddy current is generated at the one end portion 30a of the radiation plate 30 and passes through the radiation plate 30, and a magnetic field is generated at the radiation plate 30. This allows the wireless IC device to transmit/receive information to/from a reader/writer. Thus, the first end portion 30a of the radiation plate 30 shields a magnetic field generated at the inductance element 20. Accordingly, if the radiation plate 30 has a shape that is capable of transmitting/receiving a high-frequency signal of a predetermined frequency, design flexibility for a transmission/received signal is increased in a wireless IC device. Furthermore, if the area of the one end portion 30a is larger than an area required for the inductance element 20, the effect of shielding a magnetic field generated at the inductance element 20 is improved, the design flexibility is further increased, and a radiation characteristic is improved.

Since strong capacitive coupling is generated between the other end portion 30b of the radiation plate 30 and the planar electrode 25, the design flexibility for impedance matching between the wireless IC chip 5 and the radiation plate 30 is increased using the capacitance C1 that is a large capacitance. Furthermore, since there is no direct electric connection between the wireless IC chip 5 and the radiation plate 30, it is possible to prevent the wireless IC chip 5 from being broken or damaged due to the influence of static electricity that is an energy wave of about 200 MHz or lower inserted from the radiation plate 30.

A stray capacitance Cf is generated between portions of the wiring electrode of the inductance element 20, and the stray capacitance Cf affects impedance matching or a resonance frequency. However, by setting the capacitance C1 generated between the other end portion 30b of the radiation plate 30 and the planar electrode 25 to a large value, it is possible to reduce the influence of variations in the capacitance Cf due to unevenness of a gap between portions of the wiring electrode. As a result, the variation in usable frequency can be further reduced.

Furthermore, the resonance frequency of the radiation plate 30 is higher than the resonance frequency of the inductance element 20 and the usable frequency of the wireless IC device. In the first preferred embodiment, the resonance frequency of the radiation plate 30 means a resonance frequency determined by the inductance L2 of the radiation plate 30 and the capacitance C1 generated between the other end portion 30b of the radiation plate 30 and the planar electrode 25. If the resonance frequency of the radiation plate 30 is higher than the resonance frequency of the inductance element 20 and the usable frequency of the wireless IC device, the radiation plate 30 functions as an inductor at the usable frequency of the wireless IC device. As a result, a magnetic field is emitted from the radiation plate 30. By attaching the radiation plate 30 arranged to emit a magnetic field, according to the first preferred embodiment, to a dielectric such as a PET bottle filled with water or the like, a wireless IC device using the dielectric as an electromagnetic radiator can be obtained.

Still furthermore, since the feeder circuit board 10 is preferably formed by a flexible film substrate, the wireless IC device can be attached not only to a flat surface of a product but also to a curved surface of a product. As a result, the range of uses of the wireless IC device can be increased.

In the first preferred embodiment, the second end portion 30b of the radiation plate 30 and the planar electrode 25 are capacitively coupled to each other. However, a direct electric connection between them may be established. In this case, impedance matching is performed using the inductance L1 of the inductance element 20 and the stray capacitance Cf between portions of the wiring electrode of the inductance element 20.

Figure 3:
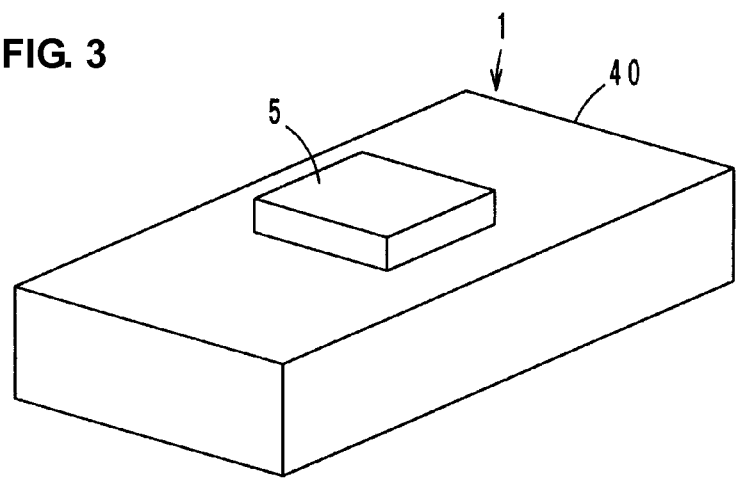
FIG. 3 is a perspective view of a wireless IC device according to a second preferred embodiment of the present invention.
Figure 4:
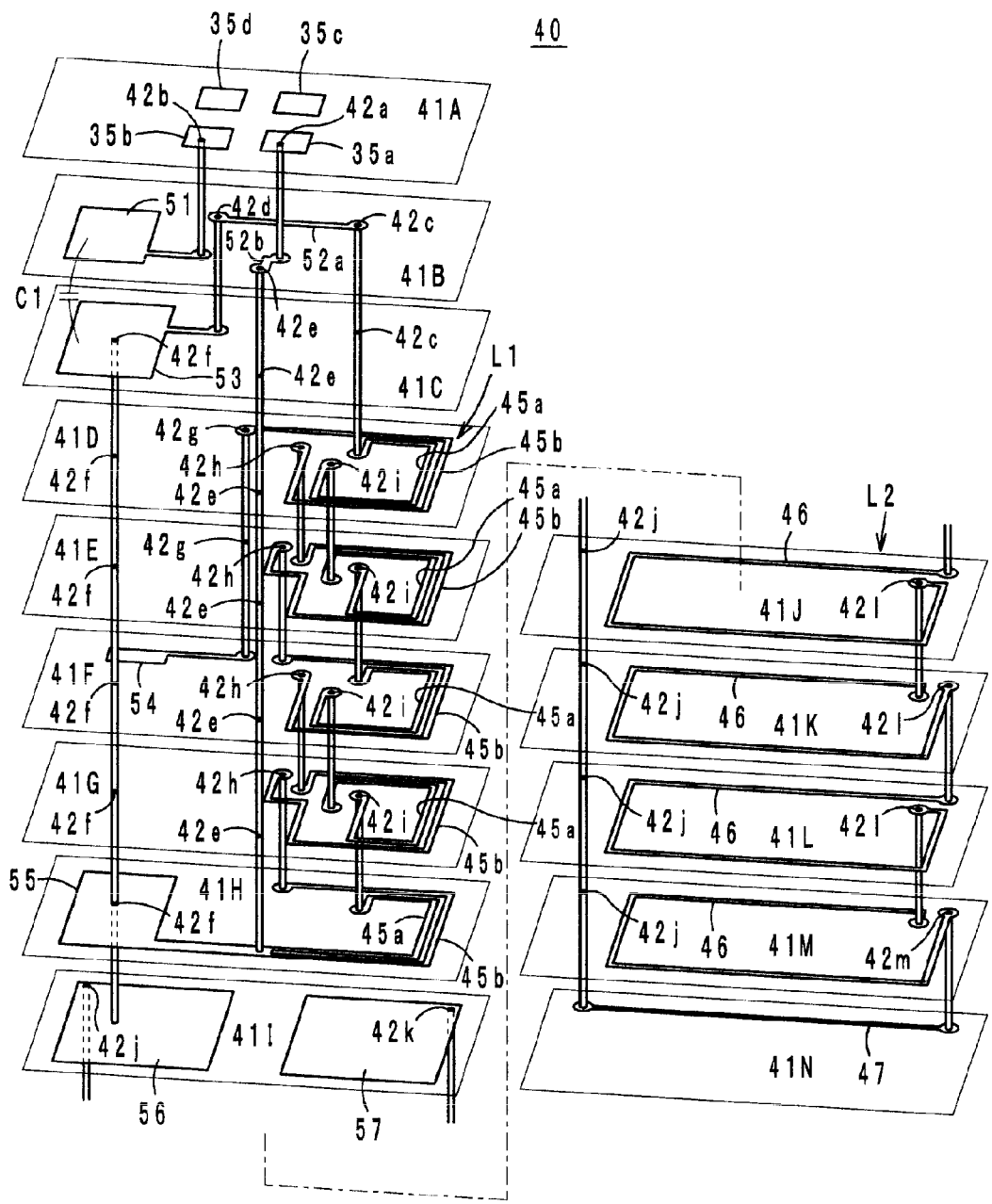
FIG. 4 is an exploded perspective view of a feeder circuit board according to the second preferred embodiment of the present invention.
Figure 5:
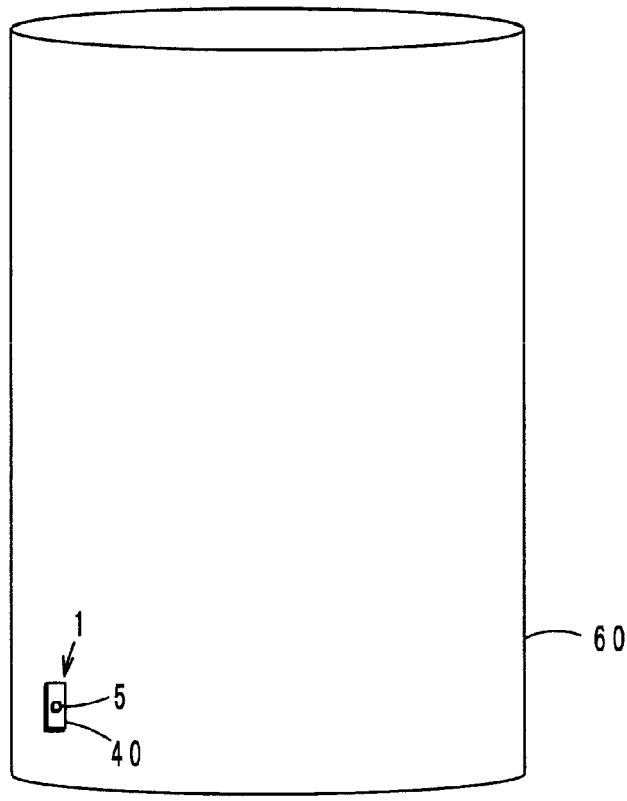
FIG. 5 is a perspective view illustrating a usage pattern of a wireless IC device according to the second preferred embodiment of the present invention.

Second Preferred Embodiment, FIGS. 3 to 5

FIGS. 3 and 4 illustrate a wireless IC device according to the second preferred embodiment of the present invention. This wireless IC device includes the electromagnetic coupling module 1 including a feeder circuit board 40 on which the wireless IC chip 5 arranged to process a transmission/received signal of a predetermined frequency is disposed.

As illustrated in FIG. 4, the feeder circuit board 40 preferably is a multilayer substrate including the inductance element L1, the inductance element L2 functioning as a radiation plate, and the capacitance element C1.

More specifically, the feeder circuit board 40 is obtained by forming electrodes to be described later on ceramic sheets 41A to 41N each formed by a dielectric using a known method such as the application of a coating of conductive paste, and laminating, press-bonding, and firing the ceramic sheets 41A to 41N.

On the ceramic sheet 41A, the connection electrodes 35a to 35d and via-hole conductors 42a and 42b are formed. On the ceramic sheet 41B, a planar electrode 51 (a second planar electrode), conductor patterns 52a and 52b, and via-hole conductors 42c, 42d, and 42e are formed. On the ceramic sheet 41C, a planar electrode 53 (a third planar electrode), the via-hole conductors 42c and 42e, and a via-hole conductor 42f are formed. On each of the ceramic sheets 41D and 41E, conductor patterns 45a and 45b, the via-hole conductors 42e and 42f, and via-hole conductors 42g, 42h, and 42i are formed. On the ceramic sheet 41F, a planar electrode 54, the conductor patterns 45a and 45b, and the via-hole conductors 42e, 42f, 42h, and 42i are formed.

Furthermore, on the ceramic sheet 41G, the conductor patterns 45a and 45b and the via-hole conductors 42e, 42f, 42h, and 42i are formed. On the ceramic sheet 41H, a planar electrode 55, the conductor pattern 45a and 45b, and the via-hole conductor 42f are formed. On the ceramic sheet 41I, a planar electrode 56, a planar electrode 57 (a first planar electrode), and via-hole conductors 42j and 42k are formed. On each of the ceramic sheets 41J to 41L, the conductor pattern 46, the via-hole conductor 42j, and a via-hole conductor 42l are formed. On the ceramic sheet 41M, the conductor pattern 46, the via-hole conductor 42j, and a via-hole conductor 42m are formed. On the ceramic sheet 41N, a conductor pattern 47 is formed.

By laminating the ceramic sheets 41A to 41N, the inductance element L1 is formed by the conductor patterns 45a and 45b that are helically connected to each other by the via-hole conductors 42h and 42i, and the inductance element L2 (a radiation plate) is formed by the conductor patterns 46 that are helically connected to each other by the via-hole element 42l. One end of the inductance element L2 is connected to the planar electrode 57 via the via-hole conductor 42k. The planar electrode 57 faces the inductance element L1. The other end of the inductance element L2 is connected to the planar electrode 56 via the via-hole conductor 42m, the conductor pattern 47, and the via-hole conductor 42j, and is further connected to the planar electrodes 55 and 53 via the via-hole conductor 42f. The planar electrode 53 faces the planar electrode 51, so that the capacitor C1 is formed.

One end of the conductor pattern 45a forming the inductance element L1 is connected to the planar electrode 53 via the via-hole conductor 42c, the conductor pattern 52a, and the via-hole conductor 42d. One end of the conductor pattern 45b is connected to the planar electrode 54 via the via-hole conductor 42g. The other ends of the conductor patterns 45a and 45b are combined on the ceramic sheet 41H and are then connected to the planar electrode 55. The other ends of the conductor patterns 45a and 45b are further connected to the connection electrode 35a via the via-hole conductor 42e, the conductor pattern 52b, and the via-hole conductor 42a. The planar electrode 51 is connected to the connection electrode 35b via the via-hole conductor 42b.

The connection electrodes 35a and 35b are electrically connected to the input/output terminal of the wireless IC chip 5 via a metal bump. The connection electrodes 35c and 35d are ground terminals and are connected to the ground terminal of the wireless IC chip 5.

In the second preferred embodiment, the inductance element L1 has a structure in which two conductor patterns, the conductor patterns 45a and 45b, are helically disposed in parallel with each other. Since the line lengths of the conductor patterns 45a and 456b are different from each other, it is possible to set different resonance frequencies. Accordingly, a wider frequency band of a wireless IC device can be achieved.

In a wireless IC device having the above-described configuration, since both ends of the inductance L2 (the radiation plate) are coupled to the resonance frequency including the inductance element L1 by electromagnetic field coupling, the impedance matching between the wireless IC chip 5 and the radiation plate is performed using the inductance element L1, the capacitance Cf between portions of the wiring electrode of the inductance element L1, and the capacitance C1 between the planar electrodes 51 and 53. Accordingly, the variation in capacitance and the variation in frequency characteristic are small. Furthermore, in order to obtain a predetermined radiation characteristic, it is possible to set the size and shape of the radiation plate irrespective of the impedance of the wireless IC chip 5.

That is, this wireless IC device receives high-frequency signals (for example, UHF signals) emitted from a reader/writer (not illustrated) using a radiation plate, causes an LC resonance circuit (in an equivalent circuit, an LC resonance circuit formed by the inductances L1 and L2 and the capacitance C1 generated between the planar electrodes 51 and 53) to resonate, and supplies only a received signal that falls within a predetermined frequency range to the wireless IC chip 5. On the other hand, the wireless IC device extracts predetermined energy from the received signal, uses the extracted energy to match the frequency of information stored in the wireless IC chip 5 to a predetermined frequency in the LC resonance circuit, and transmits the information from the radiation plate to the reader/writer.

The resonance frequency of the radiation plate is higher than the resonance frequency of the inductance element L1 and the usable frequency of the wireless IC device. In the second preferred embodiment, the resonance frequency of the radiation plate means a resonance frequency determined by the inductance element L2 and the capacitance C1 generated between the planar electrodes 51 and 53. If the radiation plate is used at or below the resonance frequency thereof, a magnetic field is generated around the radiation plate and an electromagnetic wave can be transmitted to a dielectric such as a PET bottle or water. If an electromagnetic wave is emitted to a dielectric, the electromagnetic wave is reflected at a position between components having different dielectric constants (between the electromagnetic coupling module 1 and the dielectric) and is then externally transmitted. Accordingly, as illustrated in FIG. 5, by attaching or embedding the wireless IC device to or in the surface of a PET bottle 60 filled with water, the wireless IC device can be used in an RFID system.

Since the first planar electrode 57 connected to one end of the radiation plate is disposed so that it faces the inductance element L1, a magnetic field generated at the inductance element L1 is emitted to the planar electrode 57, an eddy current is generated at the planar electrode 57 and passes through the radiation plate, and a magnetic field is generated at the radiation plate, thereby allowing the wireless IC device to transmit/receive information to/from a reader/writer. Thus, the planar electrode 57 shields a magnetic field generated at the inductance element L1. Accordingly, if the radiation plate has a shape that is capable of transmitting/receiving a high-frequency signal of a predetermined frequency, design flexibility for a transmission/received signal is increased in a wireless IC device. Furthermore, if the area of the planar electrode 57 is larger than an area required for the inductance element L1, the effect of shielding a magnetic field generated at the inductance element L1 is improved, the design flexibility is further increased, and a radiation characteristic is improved.

Since strong capacitive coupling is generated between the planar electrode 53 connected to the radiation plate and the planar electrode 51, impedance matching between the wireless IC chip 5 and the radiation plate can be achieved using the capacitance C1 that is a large capacitance. Furthermore, since there is no direct electrical connection between the wireless IC chip 5 and the radiation plate, it is possible to prevent the wireless IC chip 5 from being broken or damaged due to the influence of static electricity that is an energy wave of about 200 MHz or lower inserted from the radiation plate. Still furthermore, since the third planar electrode 53 is disposed so that it faces the second planar electrode 51, they are coupled to each other by electric field coupling (capacitive coupling).

The stray capacitance Cf is generated between portions of the wiring electrode of the inductance element L1, and the stray capacitance Cf affects impedance matching or a resonance frequency. However, by setting the capacitance C1 generated between the planar electrodes 51 and 53 to a large value, it is possible to reduce the influence of variations in the capacitance Cf due to unevenness of a gap between portions of the wiring electrode. As a result, the variation in usable frequency can be further reduced.

Since the feeder circuit board 40 preferably is a multilayer substrate, the inductance element L1 and the radiation plate (the inductance element L2) can be layered. This leads to the size reduction of the feeder circuit board 40.

In the second preferred embodiment, the planar electrode 53 connected to the radiation plate and the planar electrode 51 are capacitively coupled to each other. However, a direct electric connection between them may be established. In this case, impedance matching is performed using the inductance L1 and the stray capacitance Cf between portions of the wiring electrode.

Equivalent Circuit and Equivalent Circuit Characteristic, FIGS. 6 to 11

Figure 6:
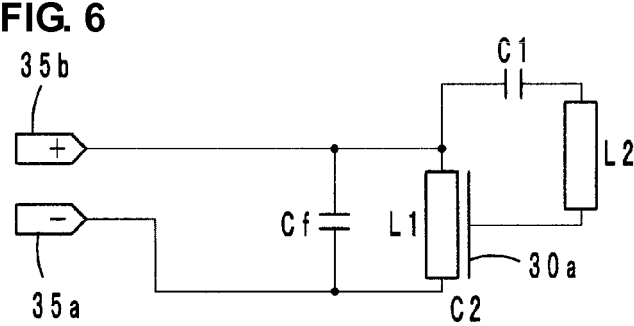
FIG. 6 is a circuit diagram illustrating a first exemplary equivalent circuit of a wireless IC device according to a preferred embodiment of the present invention.
Figure 7:
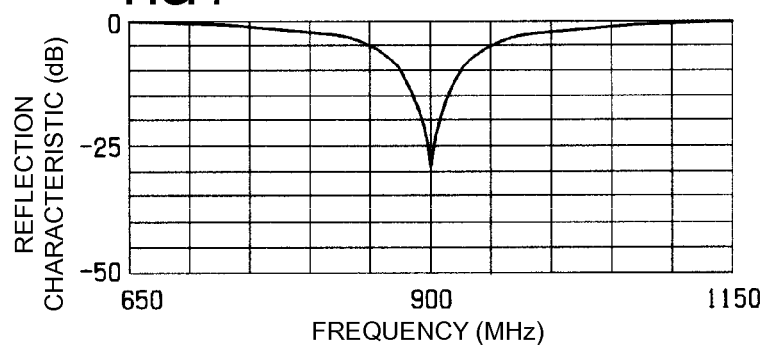
FIG. 7 is a graph illustrating a reflection characteristic of the first exemplary equivalent circuit.
Figure 8:
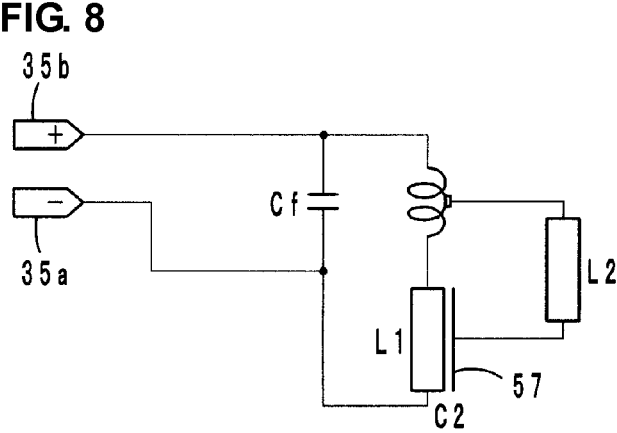
FIG. 8 is a circuit diagram illustrating a second exemplary equivalent circuit of a wireless IC device according to a preferred embodiment of the present invention.
Figure 9:
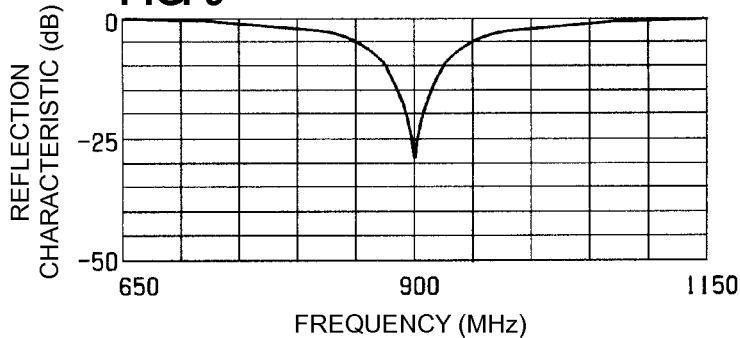
FIG. 9 is a graph illustrating a reflection characteristic of the second exemplary equivalent circuit.
Figure 10:
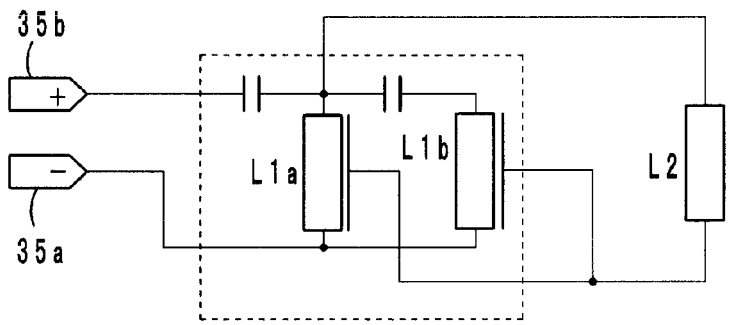
FIG. 10 is a circuit diagram illustrating a third exemplary equivalent circuit of a wireless IC device according to a preferred embodiment of the present invention.
Figure 11:
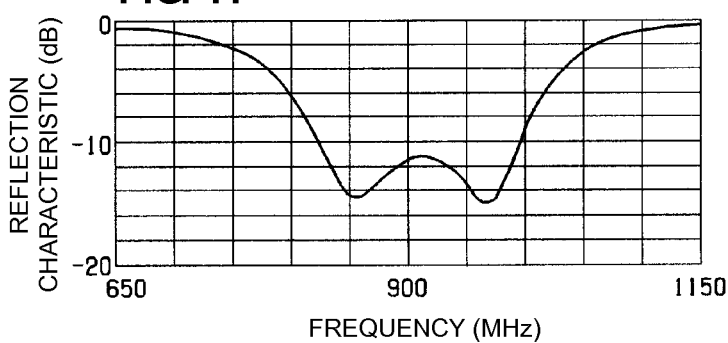
FIG. 11 is a graph illustrating a reflection characteristic of the third exemplary equivalent circuit.

FIGS. 6, 8, and 10 illustrate the equivalent circuits of a wireless IC device according to a preferred embodiment of the present invention. FIGS. 7, 9, and 11 illustrate the reflection characteristics of these equivalent circuits.

FIG. 6 illustrates a first exemplary equivalent circuit. As described in the first preferred embodiment, in this equivalent circuit, a capacitor C2 is formed preferably by disposing the first planar electrode 30a so that it faces the inductance element L1, and the capacitor C1 is formed preferably by disposing the second planar electrode 25 between the wireless IC chip 5 and the radiation plate 30 (the second inductance element L2). FIG. 7 illustrates the reflection characteristic of the first exemplary equivalent circuit. FIG. 6 schematically illustrates a state in which the inductance element L1 and the planar electrode 30a are coupled to each other by electromagnetic field coupling.

FIG. 8 illustrates a second exemplary equivalent circuit. As described in the second preferred embodiment, in this equivalent circuit, the capacitor C2 is formed preferably by disposing the first planar electrode 57 so that it faces the inductance element L1, and the other end portion of the inductance element L2 (the radiation plate) is connected to the inductance element L1. As illustrated in FIG. 9, the reflection characteristic of the second exemplary equivalent circuit is the same as that of the first exemplary equivalent circuit.

FIG. 10 illustrates a third exemplary equivalent circuit. As described in the second preferred embodiment, in this equivalent circuit, the inductance element L1 is formed preferably by two inductors L1a and L1b of different resonance frequencies. As illustrated in FIG. 11, the peak values of these resonance frequencies are generated by the inductors L1a and L1b, and a reflection characteristic in which the range of a usable frequency is increased is obtained.

In the above-described wireless IC devices according to various preferred embodiments of the present invention, since both ends of the radiation plate are coupled to the resonance circuit including the matching inductance element by electromagnetic field coupling, the impedance matching between the wireless IC chip and the radiation plate is performed using the inductance of the matching inductance element and the capacitance between portions of the wiring electrode of the matching inductance element. As a result, in order to obtain a predetermined radiation characteristic, it is possible to set the size and shape of the radiation plate irrespective of the impedance of the wireless IC chip.

It is desirable that the above-described wireless IC device include the first planar electrode that faces the matching inductance element and is electrically connected to the radiation plate. One end of the radiation plate may be formed as the first planar electrode. Alternatively, the first planar electrode may be disposed between the matching inductance element and one end of the radiation plate and be electrically connected to the radiation plate via a connection portion. The area of the first planar electrode may be larger than an area required for the matching inductance element. The radiation plate may have a loop shape or a helical shape, for example.

By arranging the first planar electrode in this manner, a magnetic field generated at the matching inductance element is emitted to the first planar electrode, an eddy current is generated at the first planar electrode and passes through the radiation plate, and a magnetic field is generated at the radiation plate, thereby allowing the wireless IC device to transmit/receive information to/from a reader/writer. The first planar electrode can shield a magnetic field generated at the matching inductance element. If the radiation plate has a shape that is capable of transmitting/receiving a high-frequency signal of a predetermined frequency, design flexibility for a transmission/received frequency is increased in a wireless IC device. If the area of the first planar electrode is larger than an area required for the matching inductance element, the effect of shielding a magnetic field generated at the matching inductance element is improved. As a result, design flexibility is further increased, and a radiation characteristic is improved.

The above-described wireless IC device may include a second planar electrode disposed between the wireless IC chip and the radiation plate. By disposing the second planar electrode in this manner, it is possible to prevent a direct current from passing between the matching inductance element and the radiation plate and to prevent the wireless IC chip from being broken or damaged due to static electricity. Furthermore, a third planar electrode may be disposed between the second planar electrode and the radiation plate. In this case, the second planar electrode is coupled to the other end of the radiation plate by electric field coupling (capacitive coupling).

The above-described wireless IC device may include the second planar electrode disposed between the wireless IC chip and the radiation plate. One end of the radiation plate may face the matching inductance element, and the other end of the radiation plate may face the second planar electrode. In this case, as viewed from one main surface of the feeder circuit board, the matching inductance element and the second planar electrode are disposed at different positions. As described previously, a magnetic field generated at the matching inductance element is shielded and a direct current is prevented from passing between the matching inductance element and the radiation plate.

It is desirable that, in the above-described wireless IC device, the resonance frequency of the radiation plate be higher than the resonance frequency of the matching inductance element and the usable frequency of the wireless IC device. The resonance frequency of the radiation plate means a resonance frequency determined by the inductance of the radiation plate and a capacitance generated between each of the ends of the radiation plate and a planar electrode or between the open ends of the radiation plate. By using the radiation plate at or below the resonance frequency thereof, a magnetic field is generated around the radiation plate. As a result, it is possible to transmit an electromagnetic wave to a dielectric such as a PET bottle or water. If an electromagnetic wave is emitted to such a dielectric, the electromagnetic wave is reflected at a position between components having different dielectric constants (the interface between the electromagnetic coupling module and the dielectric) and is then externally transmitted.

The usable frequency of the wireless IC device substantially corresponds to the resonance frequency of a resonance circuit. The reason for the substantial correspondence is that the usable frequency of the wireless IC device is sometimes slightly changed in accordance with the positional relationship between the feeder circuit board and the radiation plate. That is, since the frequency of a transmission/received signal is determined in a resonance circuit in a wireless IC device, it is possible to obtain a stable frequency characteristic irrespective of the shape and size of the radiation plate and the positional relationship between the radiation plate and the feeder circuit board.

The feeder circuit board may be a multilayer substrate including a matching inductance element and a radiation plate or may be a flexible substrate. If the feeder circuit board is a multilayer substrate, it is possible to create an inductance element as a layered-type inductance element. This leads to the size reduction of the feeder circuit board. If the feeder circuit board is a flexible substrate, it is possible to attach the wireless IC device not only to a flat surface of a product but also to a curved surface of a product. As a result, the range of uses for the wireless IC device can be increased.

A wireless IC device according to the present invention is not limited to a wireless IC device according to any one of the above-described preferred embodiments. Various changes can be made to a wireless IC device according to the present invention without departing from the spirit and scope of the present invention.

For example, the materials of the various electrodes, the radiation plate, and the film substrate which have been described in the above-described preferred embodiments are merely illustrative. Any material having a necessary characteristic can be used. Furthermore, in order to connect a wireless IC chip to a planar electrode, processing other than processing using a metal bump may be performed.

As described previously, the present invention is preferably useful for an wireless IC device including a wireless IC chip used for an RFID system, and, in particular, has an advantage in its suitability for setting the size and radiation characteristic of a radiation plate irrespective of the impedance of the wireless IC chip.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A wireless IC device comprising:
a wireless IC chip arranged to process a transmission/received signal, and including a first terminal and a second terminal;
a first inductance element connected between the first terminal and the second terminal;
a second inductance element having a loop shape; wherein
a first end of the second inductance element is capacitively coupled to the first inductance element, and a second end of the second inductance element is electrically connected to one end of the first inductance element;
the first inductance element is arranged to match impedance between the wireless IC chip and the second inductance element; and
the second inductance element defines a radiator.

2. The wireless IC device according to claim 1, wherein the first and second ends of the second inductance element are adjacent to each other.

3. The wireless IC device according to claim 1, wherein the second inductance element is a strip radiation plate.

4. The wireless IC device according to claim 1, further comprising a first planar electrode that faces the first inductance element and is electrically connected to the second inductance element.

5. The wireless IC device according to claim 4, wherein the first end of the second inductance element defines the first planar electrode.

6. The wireless IC device according to claim 4, wherein the first planar electrode is disposed between the first inductance element and the first end of the second inductance element and is electrically connected to the second inductance element via a connection portion.

7. The wireless IC device according to claim 4, wherein an area of the first planar electrode is larger than an area required for the first inductance element.

8. The wireless IC device according to claim 4, further comprising a second planar electrode disposed between the wireless IC chip and the second inductance element.

9. The wireless IC device according to claim 1, wherein the first end of the second inductance element faces the first inductance element and the second end of the second inductance element faces the second planar electrode.

10. The wireless IC device according to claim 8, wherein, as viewed from one main surface of the wireless IC chip, the first inductance element and the second planar electrode are disposed at different positions.

11. The wireless IC device according to claim 1, wherein a resonance frequency of the second inductance element is higher than a resonance frequency of the first inductance element and a usable frequency of the wireless IC device.

12. The wireless IC device according to claim 1, wherein a usable frequency of the wireless IC device substantially corresponds to a resonance frequency of the first inductance element.

13. The wireless IC device according to claim 1, further comprising a feeder circuit board defined by a multilayer substrate including the first inductance element and the second inductance element.

14. The wireless IC device according to claim 1, further comprising a feeder circuit board defined by a flexible substrate including the first inductance element and the second inductance element.

* * * * *